(12) United States Patent
Hensen et al.

(10) Patent No.: US 12,251,876 B2
(45) Date of Patent: Mar. 18, 2025

(54) METHOD AND APPARATUS FOR PRODUCING AN OBJECT BY MEANS OF ADDITIVE MANUFACTURING

(71) Applicant: Additive Industries B.V., Eindhoven (NL)

(72) Inventors: Ronnie Herman Anna Hensen, Eindhoven (NL); Mark Herman Else Vaes, Eindhoven (NL); Rob Peter Albert Van Haendel, Eindhoven (NL)

(73) Assignee: Additive Industries B.V., Eindhoven (NL)

( * ) Notice: Subject to any disclaimer, the term of this patent is extended or adjusted under 35 U.S.C. 154(b) by 0 days.

(21) Appl. No.: 18/439,262

(22) Filed: Feb. 12, 2024

(65) Prior Publication Data
US 2024/0227299 A1    Jul. 11, 2024

Related U.S. Application Data

(62) Division of application No. 17/260,130, filed as application No. PCT/NL2019/050373 on Jun. 18, 2019, now Pat. No. 11,931,962.

(30) Foreign Application Priority Data

Jul. 17, 2018  (NL) ..................... 2021323

(51) Int. Cl.
  *B29C 64/30*  (2017.01)
  *B22F 10/28*  (2021.01)
  (Continued)

(52) U.S. Cl.
  CPC ............ *B29C 64/371* (2017.08); *B22F 10/28* (2021.01); *B22F 10/32* (2021.01); *B22F 10/77* (2021.01);
  (Continued)

(58) Field of Classification Search
  None
  See application file for complete search history.

(56) References Cited

U.S. PATENT DOCUMENTS 11,931,962 B2 *  3/2024  Hensen ................. B29C 64/371
2016/0045981 A1   2/2016  Zurecki et al.
(Continued)

FOREIGN PATENT DOCUMENTS

DE          4130640 A1    3/1993
DE      102014207160 A1   10/2015
(Continued)

OTHER PUBLICATIONS

International Search Report dated Sep. 23, 2019 for PCT/NL2019/050373.

*Primary Examiner* — Geoffrey S Evans
(74) *Attorney, Agent, or Firm* — Suiter Swantz IP

(57) ABSTRACT

A method for producing an object by additive manufacturing including receiving in a process chamber a bath of material wherein a surface level of the bath of material defines an object working area, solidifying by a solidifying device a selective layer-part of the material on the surface level, and controlled oxidisation, of waste particles originating from the solidifying of the material, by controlling an oxygen level, such that oxidised waste particles are obtained and ignition of the waste particles is avoided. An apparatus for producing an objet by additive manufacturing.

22 Claims, 4 Drawing Sheets

(51) Int. Cl.
*B22F 10/32* (2021.01)
*B22F 10/77* (2021.01)
*B23K 26/34* (2014.01)
*B23K 26/354* (2014.01)
*B29C 64/371* (2017.01)
*B33Y 10/00* (2015.01)
*B33Y 30/00* (2015.01)
*B33Y 50/02* (2015.01)
*B22F 12/90* (2021.01)

(52) U.S. Cl.
CPC ............ *B23K 26/34* (2013.01); *B23K 26/354* (2015.10); *B33Y 10/00* (2014.12); *B33Y 30/00* (2014.12); *B33Y 50/02* (2014.12); *B22F 12/90* (2021.01)

(56) References Cited

U.S. PATENT DOCUMENTS

| | | |
|---|---|---|
| 2017/0182594 A1 | 6/2017 | Crear et al. |
| 2018/0065209 A1 | 3/2018 | Foret et al. |
| 2018/0126649 A1 | 5/2018 | Romano et al. |
| 2018/0128803 A1 | 5/2018 | Foret |
| 2019/0022940 A1* | 1/2019 | Hofmann ............... B29C 64/268 |

FOREIGN PATENT DOCUMENTS

| | | |
|---|---|---|
| EP | 1033421 B1 | 9/2002 |
| EP | 2832528 A1 | 2/2015 |
| EP | 3823814 B1 | 3/2023 |
| WO | 2014144630 A1 | 9/2014 |
| WO | 2016079494 A2 | 5/2016 |
| WO | 2016119887 A1 | 8/2016 |

* cited by examiner

METHOD AND APPARATUS FOR PRODUCING AN OBJECT BY MEANS OF ADDITIVE MANUFACTURING

TECHNICAL FIELD AND BACKGROUND

The present disclosure relates according to a first aspect to a method for producing an object by means of additive manufacturing.

According to a second aspect the present disclosure relates to an apparatus for producing an object by means of additive manufacturing.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to build the 3D object from a series of cross sections. These layers, which correspond to the virtual cross sections from the CAD model, are during this process joined or fused at the same time to create the final 3D object.

Known methods to print a three-dimensional object comprise the steps of:
receiving, in a process chamber, a bath of material, wherein a surface level of said bath of material defines an object working area, and
solidifying, by a solidifying device, a selective layer-part of said material on said surface level.

One of the challenges in the manufacturing of three dimensional objects, in particular in additive manufacturing of metal objects, is how to realize a relative safe manufacturing method while allowing to realize a relative high product quality.

BRIEF SUMMARY

It is an object to provide a method and apparatus with which a relative high product quality in a relative safe manner may be realized.

To this end, the invention provides a method for producing an object by means of additive manufacturing, wherein said method comprises the steps of:
receiving, in a process chamber, a bath of material, wherein a surface level of said bath of material defines an object working area;
solidifying, by a solidifying device, a selective layer-part of said material on said surface level;
controlled oxidisation, of waste particles originate from said solidifying of said material, by controlling an oxygen level, such that oxidised waste particles are obtained and ignition of said waste particles is avoided.

It is known that a three-dimensional object may be produced in an environment comprising a relative high level of inert gas for reducing oxidization of the material during solidification thereby increasing the quality of the produced object.

The present disclosure at least partly relies on the insight that when using a relative small amount of inert gas, the oxygen level may become relatively high due to leakage of air into process chamber in combination with a relative low supply rate of inert gas. A relative high oxygen level in general may have a substantial negative effect on the product quality. A relative high product quality may be obtained by supplying a relative large amount of inert gas. A drawback of a relative large supply of inert gas is that the resulting relative low oxygen level may create a relative unsafe operating condition.

Alternatively, the oxygen level may become relatively low due to oxidization of material during solidification in combination with a relative air tight process chamber. The resulting product quality may be relatively high due to the relative low oxygen level, however a drawback of a relative low oxygen level is that a relative unsafe operating condition may occur.

It is observed that at a relative low oxygen level, waste particles originating from the solidification process, either directly or after condensation of gasses resulting from solidification, are free from oxidization, or at least oxidized only to a rather limited level. Oxidization of these waste particles may occur at a relative high rate when exposed to a relative high oxygen level thereby generating a relative large amount of thermal energy as a result of which ignition of the waste particles may occur. Ignition of the waste particles may cause a potential harmful environment to an operator and/or the apparatus due to the explosive nature when the waste particles suddenly ignite.

The objective is achieved with the method in that the waste particles are oxidized in a controlled manner. By oxidizing the waste particles in a controlled manner the amount of heat generated from oxidizing the waste particles can be controlled thereby controlling the temperature of the waste particles below an ignition temperature.

It is beneficial if said method further comprises the step of extracting, by an extracting device, a mixture of gas and said waste particles from said process chamber. Extracting said mixture is beneficial for oxidising said waste particles while reducing a potential influence of said controlled oxidisation on said solidifying in said process chamber. This allows for maintaining a relative low oxygen level in said process chamber while reducing the risk of ignition of said waste particles. In other words, the process of controlled oxidation of the waste particles is decoupled from the solidifying process occurring in the process chamber.

In an embodiment of the method according to the present disclosure, during said step of extracting, a mixture of gas, said waste particles and said oxidized waste particles is extracted from said process chamber. This is beneficial for allowing controlled oxidisation of waste particles in a further location in addition to controlled oxidisation in the process chamber thereby allowing to further reduce the risk that the temperature of the waste particles increases above an ignition temperature in the process chamber or at a further location.

In this regard, it is advantageous if said method further comprises the step of filtering, by a filter device, said extracted mixture of said gas and said waste particles for collecting said waste particles. Filtering said extracted mixture is advantageous for allowing said gas to be re-used, for instance via recycling, in said process chamber, while allowing for said waste particles to be collected in said filter device. Recycling said mixture of gas and waste particles is relatively unattractive due to the increase of waste particles in said gas mixture upon recycling said mixture thereby increasing the risk of a potential unsafe operation condition.

In an embodiment of the method according to the present disclosure, during said step of filtering, a mixture of gas, said waste particles and said oxidized waste particles is filtered. Filtering said extracted mixture of gas, said waste particles and said oxidized waste particles is advantageous for allowing said gas to be re-used, for instance via recycling, in said process chamber, while allowing for said waste particles and oxidized waste particles to be collected in said filter device. Recycling said mixture of gas, said waste particles and said oxidized waste particles is relatively unattractive due to the increase of particles in said gas mixture upon recycling said mixture thereby increasing the risk of a potential unsafe operation condition.

It is noted that the waste particles may be formed from condensation of gasses occurring from the solidification of the material. Such waste particles may be formed by condensation upon or after contact of the gas with said filter device.

In a practical embodiment of said method, said method further comprises the step of transferring said waste particles, collected by said filter device, to a storage device for storing said waste particles removed from said filter device. This is beneficial for further reducing the risk of an unsafe operating condition.

Preferably, said storage device is arranged for said controlled oxidisation. This allows for maintaining a relative low oxygen level in said process chamber and filter device while reducing the risk of ignition of said waste particles. In other words, the process of controlled oxidisation and filtering of the waste particles is decoupled from the solidifying process occurring in the process chamber and decoupled from the filtering occurring in the filter device.

It is beneficial if said method further comprises the step of measuring, by a measurement device, said oxygen level, preferably said oxygen level in said process chamber. Measuring the oxygen level is beneficial for allowing a method wherein said controlled oxidisation is controlled taking into account said oxygen level.

Preferably, during said step of controlled oxidisation a controlled amount of oxygen is supplied to said waste particles for obtaining said oxidised waste particles while avoiding ignition of said waste particles.

In a preferred embodiment of the method according to the first aspect of the present disclosure, said controlled amount of oxygen is supplied to said waste particles taking into account said measured oxygen level. This is attractive for realising a rate of controlled oxidization, preferably a relative constant rate of controlled oxidization, and thereby controlling the amount of heat generated from oxidizing the waste particles for maintaining the temperature of the waste particles below an ignition temperature.

It is advantageous if said method further comprises the step of determining an oxidisation rate taking into account said measured oxygen level and said supplied amount of oxygen. By determining an oxidisation rate it may be determined whether the waste particles are oxidized or if oxidization occurs. Upon determining an oxidisation rate of zero or substantially zero in the presence of oxygen a relative safe operating condition is achieved as regards ignition of said waste particles in that a relative large amount of the waste particles are oxidized.

It is beneficial if during said step of controlled oxidisation a controlled amount of chalk is supplied to said waste particles for preventing oxidisation of a subset of said waste particles. Preventing oxidisation of a subset of particles is beneficial for reducing the amount oxidisation occurring and thereby reducing the amount of thermal energy generated during a time interval. A reduced amount of thermal energy generated by oxidization is beneficial for reducing the risk of ignition of the waste particles.

In a practical embodiment of the method according to the first aspect said process chamber is arranged for allowing, during said step of solidifying, ambient air to enter said process chamber, wherein during said step of controlled oxidisation a controlled amount of inert gas is supplied to said process chamber for realising a desired oxygen level in said process chamber for controlled oxidisation of said waste particles for obtaining said oxidised waste particles.

In this regard it is beneficial if said controlled amount of inert gas is supplied taking into account said determined oxidisation rate. By controlling the supply of inert gas taking into account said determined oxidisation rate the supply of inert gas may be controlled more accurately and thereby result in a more controlled oxidisation of the waste particles.

Preferably, during said step of solidifying said oxygen level in said process chamber is in the range of 50 ppm to 1000 ppm. An oxygen level in the range of 50 ppm to 1000 ppm is preferred for realising controlled oxidisation while maintaining a relative high quality of the produced object.

In an embodiment of the method according to the first aspect, said controlled oxidisation is performed during said step of solidifying. This is beneficial for realising a relative efficient method without the need for interrupting the step of solidifying to oxidise the waste particles thereby allowing to produce an object in a relative short time period while maintaining relative safe operation conditions and allowing to realize a relative high product quality.

In this regard it is beneficial if said controlled oxidisation is performed in said process chamber and wherein said oxygen level in said process chamber during said solidifying is in the range of 50 ppm to 1000 ppm, preferably wherein said oxygen level is maintained constant during said solidifying, preferably maintained constant in the range of 50 ppm to 1000 ppm. An oxygen level in the range of 50 ppm to 1000 ppm is preferred for realising controlled oxidisation while maintaining a relative high quality of the produced object. Maintaining the oxygen level in the process chamber constant during the step of solidifying is beneficial for realizing a relative constant oxidization rate.

In an embodiment of the method according to the first aspect, said controlled oxidisation is performed during said step of solidifying and during said step of filtering and/or transferring. This is beneficial for allowing controlled oxidisation of waste particles in two separate locations thereby allowing to further reduce the risk that the temperature of the waste particles increases above an ignition temperature in the process chamber, filter device or storage device.

In a very attractive embodiment of the method according to the first aspect said material is a metal powder.

It is beneficial if said extracted gas is returned to said process chamber. This is beneficial for realising a relative low consumption of gas.

It is advantageous if during said step of solidifying said solidifying device is controlled for controlling said solidifying taking into account said measured oxygen level and said determined oxidisation rate. This is beneficial for realising a controlled oxidisation of waste particles at a relative low oxidisation rate and thereby reducing the risk of ignition of the waste particles during said controlled oxidization.

In an embodiment of the method according to the first aspect said controlled oxidisation is performed during said step of filtering and/or transferring. This allows for maintaining a relative low oxygen level in said process chamber while reducing the risk of ignition of said waste particles. In other words, the process of controlled oxidisation of the waste particles is decoupled from the solidifying process occurring in the process chamber. This is beneficial for avoiding, or at least significantly reducing, an impact of the controlled oxidisation on the atmosphere in the process chamber and thereby allowing realisation of a relative high product quality while maintaining relative safe operating conditions.

In this regard it is beneficial if said filter device and/or said storage device is arranged for allowing, preferably during said step of solidifying, ambient air to enter said filter device and/or said storage device, wherein during said step of controlled oxidisation a controlled amount of inert gas is supplied to said filter device and/or said storage device for realising a desired oxygen level in said filter device and/or said storage device for controlled oxidisation of said waste particles for obtaining said oxidised waste particles.

In this regard it is advantageous if said controlled amount of inert gas is supplied taking into account said determined oxidisation rate. By controlling the supply of inert gas taking into account said determined oxidisation rate the supply of inert gas may be controlled more accurately and thereby result in a more controlled oxidisation of the waste particles.

According to the second aspect the present disclosure relates to an apparatus for producing an object by means of additive manufacturing, said apparatus comprising:
- a process chamber for receiving a bath of material, wherein a surface level of said bath of material defines an object working area;
- a solidifying device for solidifying a selective layer-part of said material on said surface level;
- an oxidisation device arranged for controlled oxidisation of waste particles originating from said solidifying of said material, by controlling an oxygen level, in use, such that oxidised waste particles are obtained and ignition of said waste particles is avoided.

The advantages of the apparatus are analogue to the advantages of the method according to the first aspect of the present disclosure.

In this regard it is beneficial if said apparatus further comprises an extracting device for extracting a mixture of gas and said waste particles from said process chamber. An extracting device for extracting said mixture is beneficial for oxidising said waste particles while reducing a potential influence of said controlled oxidisation on said solidifying in said process chamber. This allows for maintaining a relative low oxygen level in said process chamber while reducing the risk of ignition of said waste particles. In other words, the process of controlled oxidisation of the waste particles is decoupled from the solidifying process occurring in the process chamber.

It is beneficial if said apparatus further comprises a filter device arranged for collecting said waste particles from said extracted mixture of said gas and said waste particles. A filter device for filtering said extracted mixture is advantageous for allowing said gas to be re-used, for instance via recycling, in said process chamber, while allowing for said waste particles to be collected in said filter device. Recycling said mixture of gas and waste particles is relatively unattractive due to the increase of waste particles in said gas mixture upon recycling said mixture thereby increasing the risk of a potential unsafe operation condition.

Preferably, said apparatus further comprises a storage device arranged for storing said waste particles, wherein said storage device is further arranged for said controlled oxidisation. This is beneficial for further reducing the risk of an unsafe operating condition.

In this regard, it is preferred if said storage device is further arranged for said controlled oxidisation. This allows for maintaining a relative low oxygen level in said process chamber and in said filter device while reducing the risk of ignition of said waste particles. In other words, the process of controlled oxidisation of the waste particles is decoupled from the solidifying process occurring in the process chamber and decoupled from the filtering occurring in the filter device.

In a preferred embodiment of the apparatus according to the second aspect of the present disclosure, said oxidisation device is arranged for maintaining an oxygen level in said process chamber, in use, during solidification of said material, in the range of 50 ppm to 1000 ppm. An oxygen level in the range of 50 ppm to 1000 ppm is preferred for realising controlled oxidisation while maintaining a relative high quality of the produced object. Maintaining the oxygen level in the process chamber constant during the step of solidifying is beneficial for realizing a relative constant oxidization rate.

It is advantageous if said apparatus further comprises a measurement device for measuring an oxygen level, preferably for measuring an oxygen level in said process chamber. Such a measurement device is beneficial for allowing to produce an object wherein said oxidisation is controlled taking into account a measured oxygen level.

Preferably, said measurement device is further arranged for measuring a further oxygen level in said filter device and/or said storage device.

This is beneficial for allowing controlled oxidisation of waste particles in two separate locations thereby allowing to further reduce the risk that the temperature of the waste particles increases above an ignition temperature in the process chamber, filter device or storage device

BRIEF DESCRIPTION OF THE DRAWINGS

The method and apparatus according to the present disclosure will next be explained by means of the accompanying figures. In the figures.

DETAILED DESCRIPTION

Figure 1:
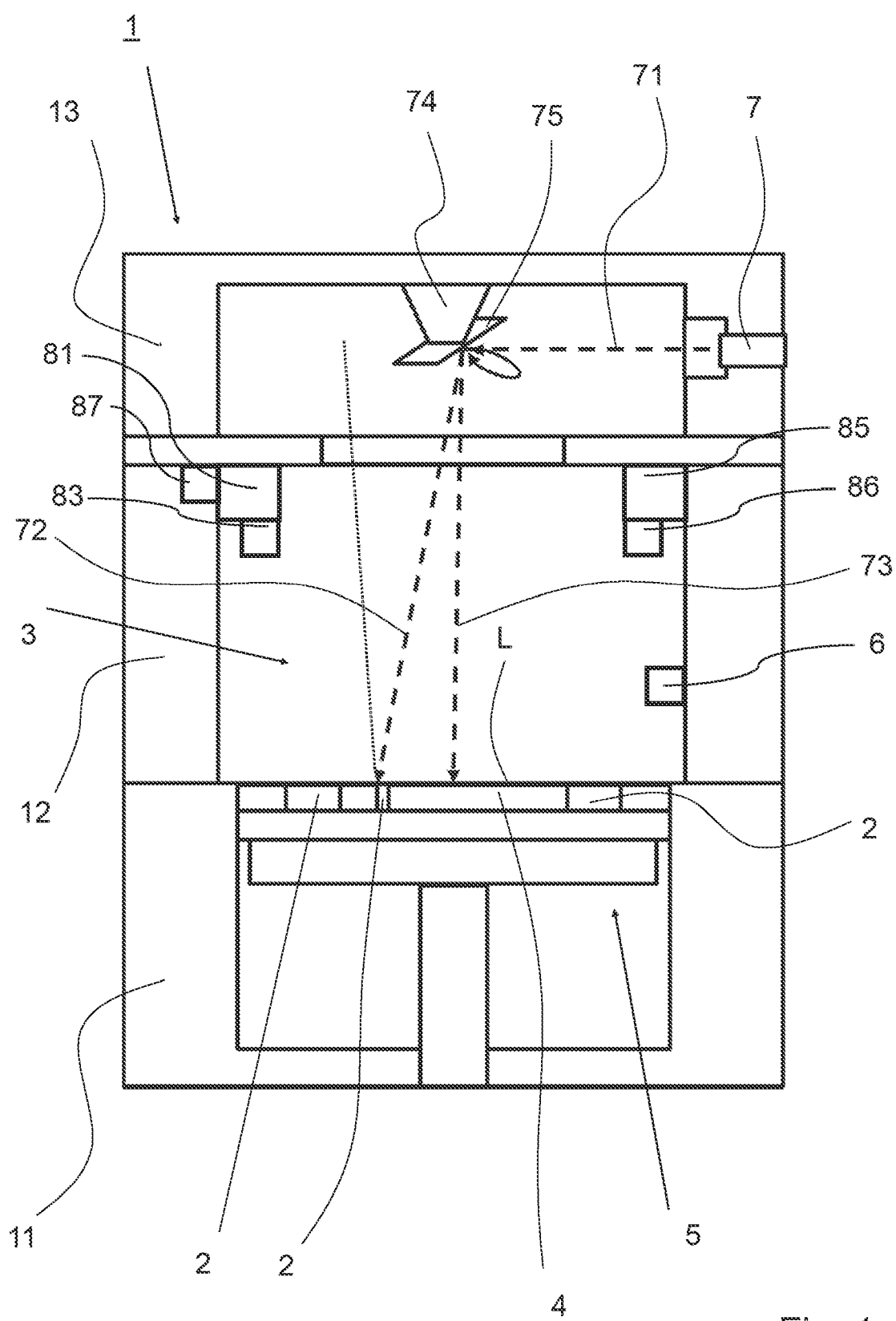
FIG. 1 shows a schematic overview of an apparatus according to the invention, arranged for producing an object by means of additive manufacturing.

FIG. 1 shows an overview of an apparatus 1 for producing an object 2 by means of additive manufacturing. The apparatus 1 is built from several frame parts 11, 12, 13. The apparatus comprises a process chamber 3 for receiving a bath of material 4 which can be solidified. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material 4. In the embodiment shown, the solidifying device 7 is a laser device, which is arranged for producing electromagnetic radiation in the form of laser light, in order to melt powdered material 4 provided on the support 5, which then, after cooling forms a solidified part of the object 2 to be produced. However, the invention is not limited to the type of solidifying device. As can be seen, the electromagnetic radiation 71 emitted by the laser device 7 is deflected by means of a deflector unit 74, which uses a rotatable optical element 75 to direct the emitted radiation 71 towards the surface L of the layer of material 4. Depending on the position of the deflector unit 74, radiation may be emitted, as an example, according to rays 72, 73.

Apparatus 1 is provided with an oxidization device 81 coupled to an oxygen supply (not shown). The oxygen supply may contain dry clean air comprising approximately 20% oxygen and 80% nitrogen. The oxidization device 81 further comprises a supply organ 83 for supplying oxygen from the oxygen supply into the process chamber 3. The process chamber 3 is substantially airtight and may be filled with an inert gas such as Argon or nitrogen via a gas supply 6.

A measurement device 85 comprising a sensor 86 is provided for measuring the oxygen level in the process chamber 3. The measurement device 85 and the oxidization device 81 are communicatively coupled to a controller 87. The controller 87 is arranged for controlling the amount of oxygen supplied via the supply organ 83 into the process chamber 3 taking into account the oxygen level in the process chamber 3 measured by the measurement device 85 for maintaining the oxygen level in the process chamber 3 at a predetermined concentration within a predetermined range of 50 ppm to 1000 ppm.

Alternatively, it is conceivable that the oxygen level in the process chamber of apparatus 1 is maintained at a predetermined concentration within a predetermined range of 50 ppm to 1000 ppm by communicatively coupling the gas supply 6 to the controller 87 instead or in addition to the coupling of the oxygen supply to the controller 87. In this alternative configuration of apparatus 1, wherein air may leak into the process chamber, the oxygen level may be controlled by controlling the amount of inert gas supplied via the gas supply 6 into the process chamber taking into account the oxygen level in the process chamber 3 measured by the measurement device 85.

Figure 2:
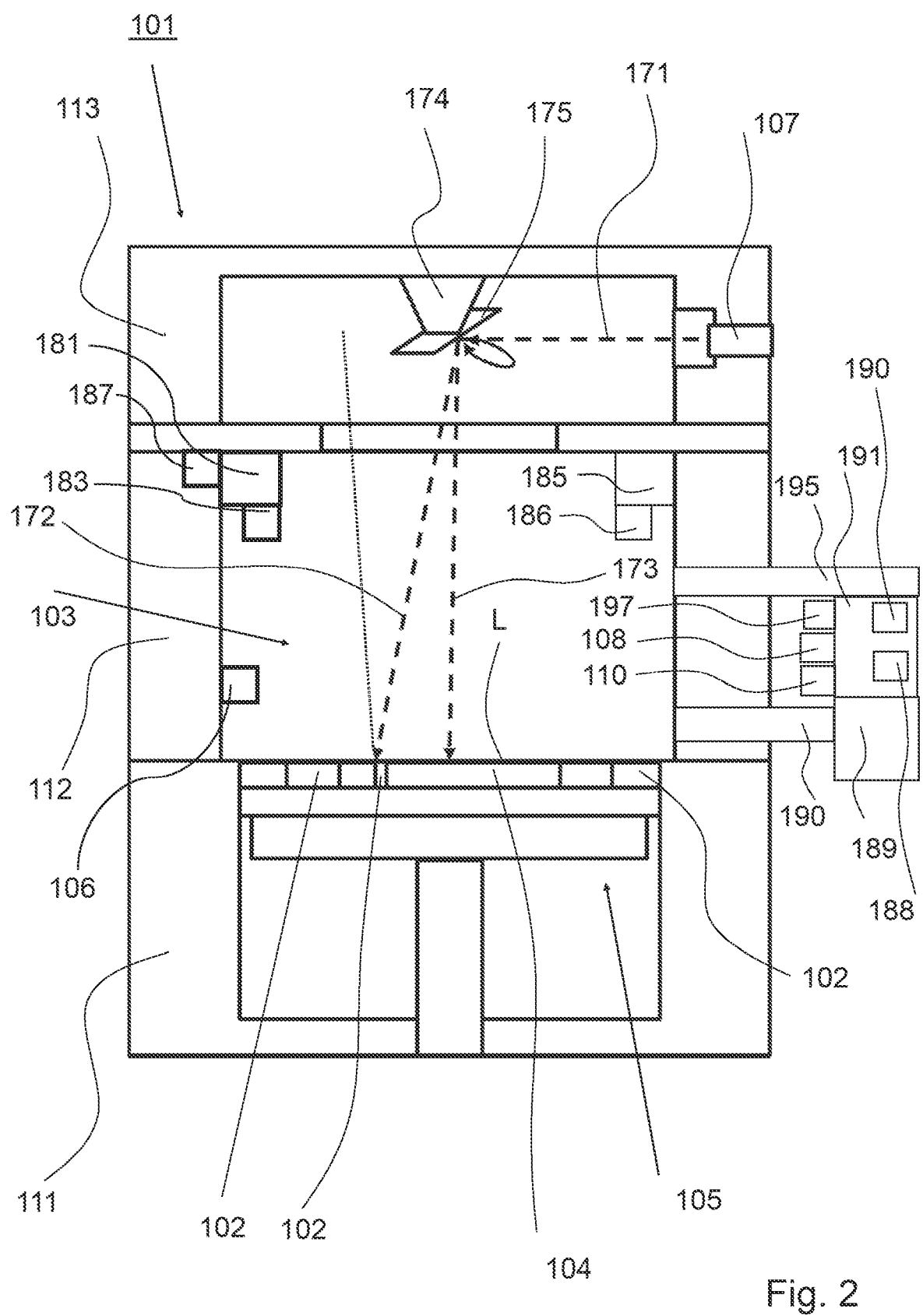
FIG. 2 shows a schematic overview of an apparatus according to the invention, arranged for producing an object by means of additive manufacturing.

A further embodiment of an apparatus 101 according to the present disclosure is shown in FIG. 2. Elements of apparatus 101 that are similar to elements of apparatus 1 are provided with a reference number equal to the reference number of the element in apparatus 1 raised by 100. Apparatus 101 comprises an extraction device formed as a fan 189 for extracting a mixture of gas, waste particles and oxidized waste particles from the process chamber 103 via an extraction connection 190. The extracted mixture of gas, waste particles and oxidized waste particles is directed to a filter device 191 for separating waste particles from the gas before returning the gas back via a return line 195 into the process chamber 103. By supplying oxygen to the filter device 191 at a side turned away from the return line 195, via a further supply organ 110, waste particles collected by said filter device 191 may be subjected to oxidization.

Measurement device 185 comprises sensor 186 and a further sensor 188. Sensor 186 is provided for measuring the oxygen level in the process chamber 103. The further sensor 188 is arranged for measuring the oxygen level in the filter device 191. The measurement device 185 and the oxidization device 181 are communicatively coupled to a controller 187. The controller 187 is arranged for controlling the amount of oxygen supplied via the supply organ 183 into the process chamber 103 taking into account the oxygen level in the process chamber 103 measured by the measurement device 185 for maintaining the oxygen level in the process chamber 103 at a predetermined concentration within a predetermined range of 50 ppm to 1000 ppm. The controller 187 is further arranged for controlling the amount of oxygen supplied via the further supply organ 110 into the filter device 191 taking into account the further oxygen level in the filter device 191 at a predetermined concentration within a predetermined range of 50 ppm to 1000 ppm.

The waste particles and the oxidized waste particles, collected by the filter device 191, are transferable to a storage device 197 for storing the waste particles and the oxidized waste particles. The waste particles are removable from the filter device 191 by applying a flow of gas in a reverse direction, ie. from the side of the return line 195. To this end, the apparatus 101 is provided with a cleaning nozzle 190 that is directed to the clean side of the filter device 191 for providing said flow of gas in said reverse direction. Alternatively, it is conceivable that the waste particles and the oxidized waste particles may be removed from the filter device by vibrating the filter device.

Apparatus 101 is further provided with a chalk supply 108 for supplying chalk to the filter device 191 at a side of the filter device 191 turned away from the return line 195. The chalk supply 108 is arranged for applying a layer of chalk to the filter device 191 for binding the waste particles to the chalk applied to the filter device 191. Any chalk applied to the filter device 191 may be removed from the filter device 191 and stored in the storage device 197 by applying said flow of gas in said reverse direction or said vibrating action. The chalk supply 108 is communicatively coupled to the controller 187 for controlling the amount of chalk supplied by said chalk supply 108 taking into account said measured oxygen level and/or said further oxygen level and/or said amount of oxygen supplied to said mixture of gas, waste particles and oxidized waste particles.

Figure 3:
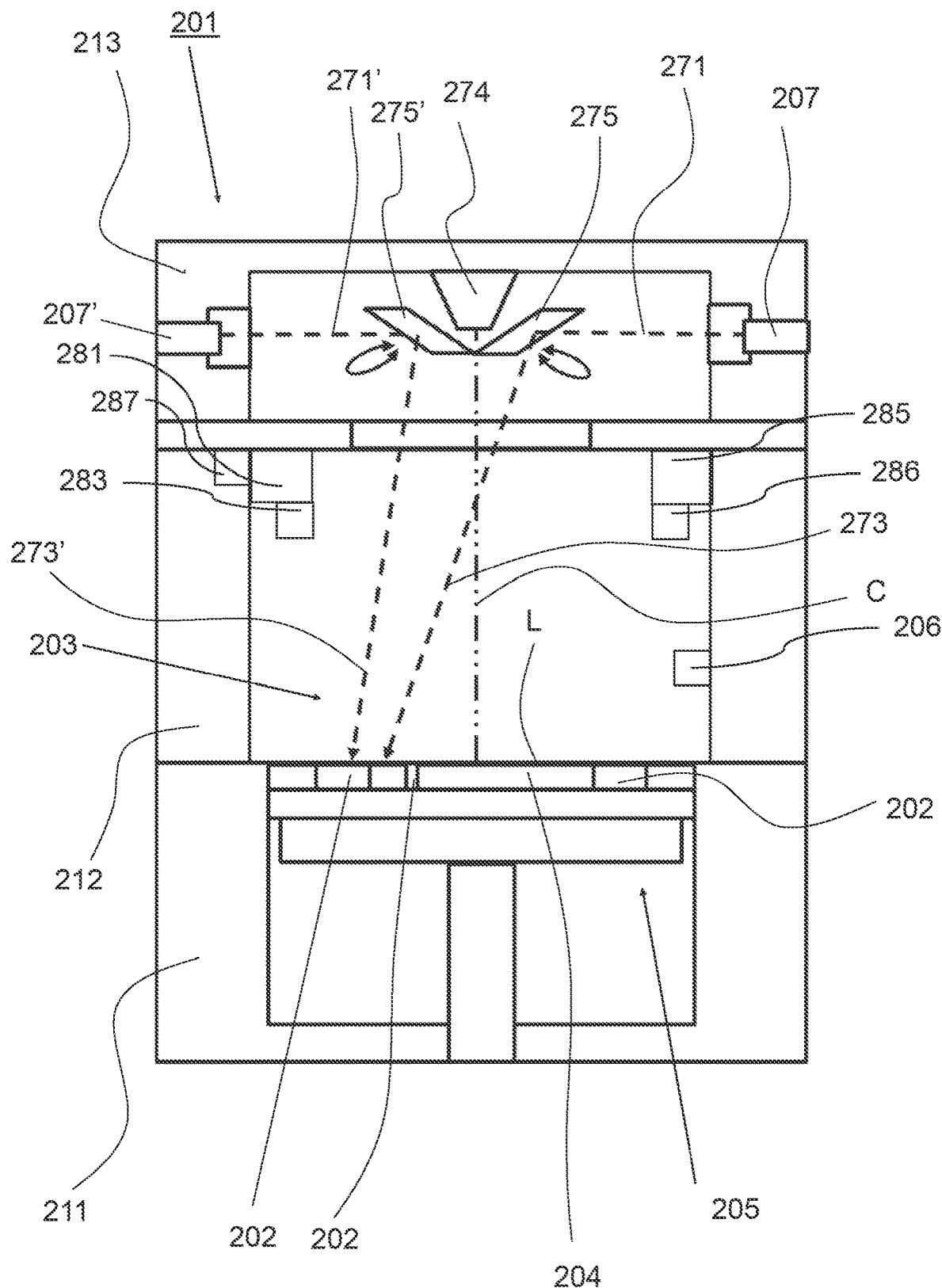
FIG. 3 shows a schematic overview of an apparatus according to the invention, arranged for producing an object by means of additive manufacturing.

FIG. 3 shows an overview of an apparatus 201 for producing an object 202 by means of additive manufacturing, according to yet a further embodiment of the present invention. Elements of apparatus 201 that are similar to elements of apparatus 1 are provided with a reference number equal to the reference number of the element in apparatus 1 raised by 200. As in the previous embodiments, a first solidifying device 207 is provided for solidifying a selective part of the material by means of electromagnetic radiation. The top part 213 of the apparatus 201 also comprises a further solidifying device 207' for solidifying a selective part of the material by means of electromagnetic radiation. As can be seen, the electromagnetic radiation 271' emitted by the further laser device 207' is deflected by means of a further rotatable deflector unit 275' to direct the emitted radiation 271' thereof towards the surface L of the layer of material 204.

In the embodiment shown in FIG. 3, the solidifying device 207 and the further solidifying device 207' are laser devices, which are arranged for producing electromagnetic radiation in the form of laser light, in order to melt a powdered material provided on the support, which then, after cooling forms a solidified part of the object to be produced. However, the invention is not limited to this type of solidifying device, but comprises in general solidifying devices that use electromagnetic radiation. Furthermore, the type of electromagnetic radiation emitted by the plurality of solidifying devices may be the same for each and every solidifying device, although it is conceivable that the type of electromagnetic radiation emitted by the plurality of solidifying devices differs for at least two of the plurality of solidifying devices.

It can be seen furthermore in FIG. 3, that the plurality of deflector means 275, 275' are positioned near a line C perpendicular to the plane defined by the object working area L, and which line C passes through geometrical centre of gravity of the object working area L. In other words, the deflector means 275, 275' are substantially provided above a centre part of the object working area L. This allows each of the plurality of solidifying devices to easily reach substantially the entire object working area, such that, for instance, simultaneous solidifying of different parts of a single object may occur. By simultaneously solidifying different parts of a single object, this object may be produced more quickly, and total production time of the object may be decreased.

Figure 4:
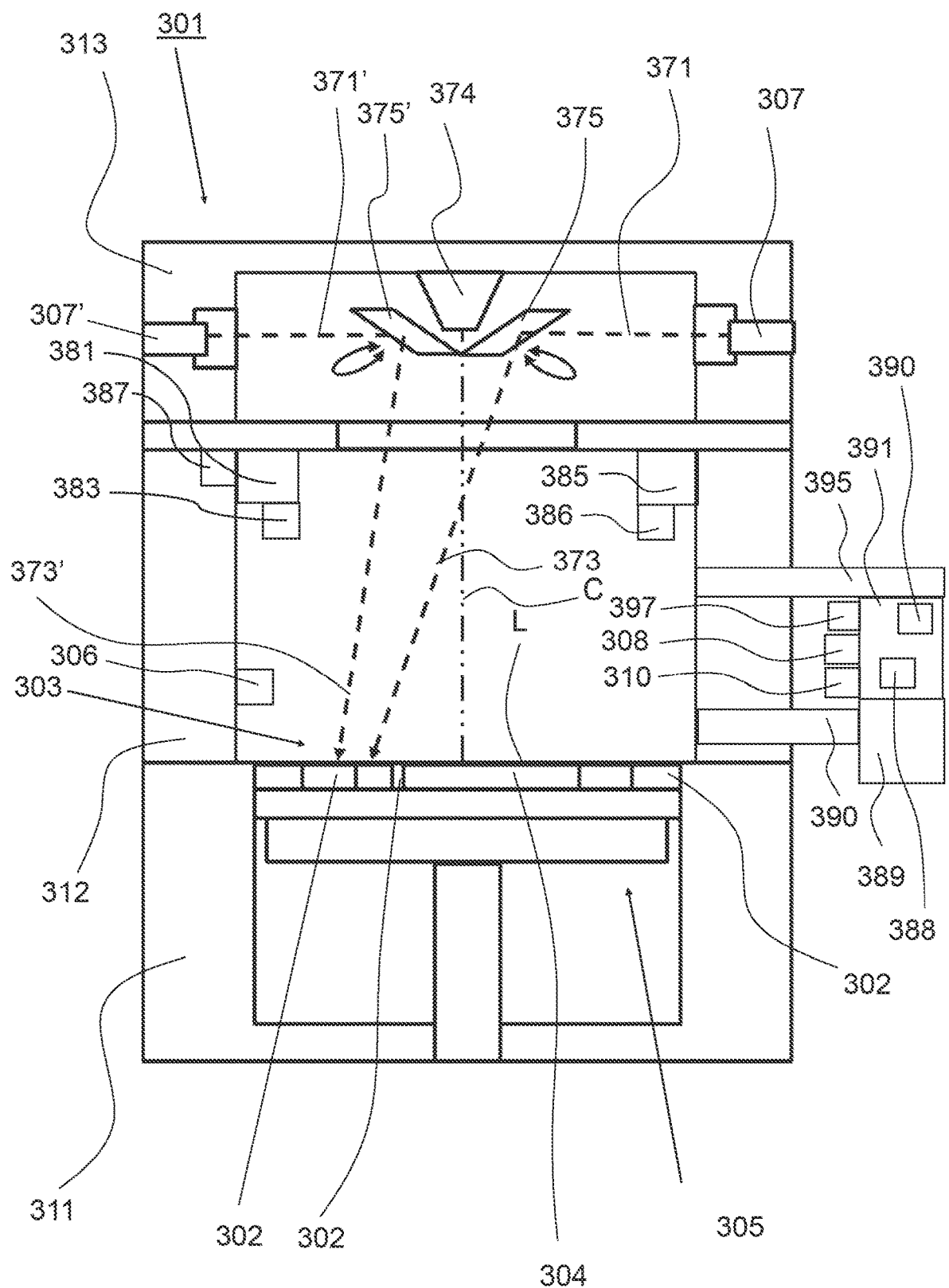
FIG. 4 shows a schematic overview of an apparatus according to the invention, arranged for producing an object by means of additive manufacturing.

FIG. 4 shows an overview of an apparatus 301 for producing an object 302 by means of additive manufacturing, according to yet a further embodiment of the present invention. Elements of apparatus 301 that are similar to elements of apparatus 101 or 201 are provided with a reference number equal to the reference number of the element in apparatus 101 or 201 raised by 200 and 100, respectively.

Using the apparatus 1, waste particles originating from solidification of material 4, either directly or after condensation, by irradiation of the material 4 with the laser device 7, may be oxidized in a controlled manner by controlling the oxygen level in the process chamber 3. The oxygen level in the process chamber 3 is measured during solidification of the material 4 using sensor 86.

The measured oxygen level is compared to a target oxygen level by the controller 87. If it is determined that the oxygen level in the process chamber 3 is below the predetermined level, oxygen is supplied via the supply organ 83 into the process chamber 3 until the predetermined oxygen level is realized. The oxygen level in the process chamber 3 is maintained at the predetermined value by continuously supplying oxygen via the supply organ 83. Based on the rate of oxygen supply via the supply organ 83 and the measured oxygen level in the process chamber 3 an oxidization rate is determined by said controller 87. A relative low oxidization rate may be used as an indication that the waste particles are produced at a relative low rate or that a relative large amount of the waste particles are oxidized. If it is determined that a relative high oxidation rate occurs at or below the target oxygen level the solidification rate of the material may be reduced for maintaining a relative safe operating condition.

Using the apparatus 201, waste particles originating from solidification of material 204, either directly or after condensation, by irradiation of the material 204 with the laser device 207 and further laser 207', may be oxidized in a controlled manner by controlling the oxygen level in the process chamber 203 in a manner similar as describe before when using apparatus 1.

Using apparatus 101, waste particles originating from solidification of material 104, either directly or after condensation, by irradiation of the material 104 with the laser device 107, may be oxidized in a controlled manner by controlling the oxygen level in the process chamber 103 and by controlling a further oxygen level in the filter device 191. The oxygen level in the process chamber 103 is measured during solidification of the material 104 using sensor 186. The measured oxygen level is compared to a target oxygen level by the controller 187. If it is determined that the oxygen level in the process chamber 103 is below the predetermined level, oxygen is supplied via the supply organ 183 into the process chamber 103 until the predetermined oxygen level is realized. The oxygen level in the process chamber 103 is maintained at the predetermined value by continuously supplying oxygen via the supply organ 183. Based on the rate of oxygen supply via the supply organ 183 and the measured oxygen level in the process chamber 103 an oxidization rate is determined by said controller 187.

The further oxygen level in the filter device 191 is measured during solidification of the material 104 using sensor 188. The measured further oxygen level is compared to a target oxygen level by the controller 187. If it is determined that the oxygen level in the filter device 191 is below the predetermined level, oxygen is supplied via the further supply organ 110 into the filter device 191 until the predetermined further oxygen level is realized. The oxygen level in the filter device 191 is maintained at the predetermined value by continuously supplying oxygen via the further supply organ 110. Based on the rate of oxygen supply via the further supply organ 110 and the measured oxygen level in the filter device 110 a further oxidization rate is determined by said controller 187.

After filtering the waste particles and the oxidized waste particles in the filter device 191, the filtered gas is returned via return line 195 back into the process chamber 103. If it is determined that the further oxidization rate is zero, or relatively low, the waste particles and the oxidized waste particles are removed from the filter device 191 and transferred to the storage device 197 by applying a flow of gas in a reverse direction using the cleaning nozzle 190.

Using the apparatus 301, waste particles originating from solidification of material 304, either directly or after condensation, by irradiation of the material 304 with the laser device 307 and further laser 307', may be oxidized in a controlled manner in a manner similar as describe before when using apparatus 101.

The invention claimed is:

1. A method for producing an object by additive manufacturing, the method comprising the steps of:
receiving, in a process chamber, a bath of material, wherein a surface level of the bath of material defines an object working area;
solidifying, by a solidifying device, a selective layer-part of the material on the surface level;
controlled oxidization, of waste particles originating from the solidifying of the material, by controlling an oxygen level in the process chamber, such that oxidized waste particles are obtained and ignition of the waste particles is avoided; and
measuring, by a measurement device, the oxygen level in the process chamber,
wherein during the step of controlled oxidization, a controlled amount of oxygen is supplied to the waste particles to obtain the oxidized waste particles while avoiding ignition of the waste particles, and wherein the controlled amount of oxygen is supplied to the waste particles based on the measured oxygen level.

2. The method according to claim 1, further comprising the step of extracting, by an extracting device, a mixture of gas and the waste particles from the process chamber.

3. The method according to claim 2, wherein the extracted gas is returned to the process chamber.

4. The method according to claim 2, further comprising the step of filtering, by a filter device, the extracted mixture of the gas and the waste particles for collecting the waste particles.

5. The method according to claim 4, further comprising the step of transferring the waste particles, collected by the filter device, to a storage device for storing the waste particles removed from the filter device, wherein the storage device is configured for the controlled oxidization.

6. The method according to claim 4, wherein the controlled oxidization is performed during the step of filtering and/or during a step of transferring the waste particles, collected by the filter device, to a storage device for storing the waste particles removed from the filter device, wherein the storage device is configured for the controlled oxidization.

7. The method according to claim 6, wherein the filter device and/or the storage device is configured for allowing, during the step of solidifying, ambient air to enter the filter device and/or the storage device, wherein during the step of controlled oxidization a controlled amount of inert gas is supplied to the filter device and/or the storage device for realizing a desired oxygen level in the filter device and/or the storage device for controlled oxidization of the waste particles for obtaining the oxidized waste particles.

8. The method according to claim 7, wherein the controlled amount of inert gas is supplied based on the determined oxidization rate.

9. The method according to claim 1, further comprising the step of determining an oxidization rate based on the measured oxygen level and the supplied amount of oxygen.

10. The method according to claim 1, wherein during the step of controlled oxidization a controlled amount of chalk is supplied to the waste particles for preventing oxidization of a subset of the waste particles.

11. The method according to claim 1, wherein the process chamber is configured for allowing, during the step of solidifying, ambient air to enter the process chamber, and wherein during the step of controlled oxidization a controlled amount of inert gas is supplied to the process chamber for realizing a desired oxygen level in the process chamber for controlled oxidization of the waste particles for obtaining the oxidized waste particles.

12. The method according to claim 11, wherein the controlled amount of inert gas is supplied based on the determined oxidization rate.

13. The method according to claim 1, wherein during the step of solidifying:
the oxygen level in the process chamber is in the range of 50 ppm to 1000 ppm;
the controlled oxidization is performed in the process chamber; and
the oxygen level is maintained constant during the solidifying.

14. The method according to claim 1, wherein the controlled oxidization is performed during a step of filtering, by a filter device, the extracted mixture of the gas and the waste particles for collecting the waste particles and/or during a step of transferring the waste particles, collected by the filter device, to a storage device for storing the waste particles removed from the filter device, wherein the storage device is configured for the controlled oxidization.

15. The method according to claim 1, wherein during the step of solidifying, the solidifying device is controlled for controlling the solidifying based on the measured oxygen level and a determined oxidization rate based on the measured oxygen level and the supplied amount of oxygen.

16. An apparatus for producing an object by additive manufacturing, comprising:
a process chamber for receiving a bath of material, wherein a surface level of the bath of material defines an object working area;
a solidifying device for solidifying a selective layer-part of the material on the surface level;
an oxidization device configured for controlled oxidization of waste particles originating from the solidifying of the material, by controlling an oxygen level in the process chamber, in use, such that oxidized waste particles are obtained and ignition of the waste particles is avoided; and
a measurement device for measuring the oxygen level in the process chamber,
wherein the oxidation device is configured, during the step of controlled oxidization, to control an amount of oxygen supplied based on the oxygen level measured in the process chamber.

17. The apparatus according to claim 16, further comprising:
an extracting device for extracting a mixture of gas and the waste particles from the process chamber;
a filter device for collecting the waste particles from the extracted mixture of the gas and the waste particles; and
a storage device for storing the waste particles, wherein the storage device is configured for the controlled oxidization.

18. The apparatus according to claim 17, wherein the measurement device is configured for measuring an oxygen level in at least one of the filter device and a storage area of a storage device for storing the waste particles, wherein the storage device is configured for the controlled oxidization.

19. A method for producing an object by additive manufacturing, the method comprising the steps of:
receiving, in a process chamber, a bath of material, wherein a surface level of the bath of material defines an object working area;
solidifying, by a solidifying device, a selective layer-part of the material on the surface level; and controlled oxidization, of waste particles originating from the solidifying of the material, by controlling an oxygen level, such that oxidized waste particles are obtained and ignition of the waste particles is avoided, wherein during the step of controlled oxidization, a controlled amount of chalk is supplied to the waste particles for preventing oxidization of a subset of the waste particles.

20. A method for producing an object by additive manufacturing, the method comprising the steps of:
receiving, in a process chamber, a bath of material, wherein a surface level of the bath of material defines an object working area;
solidifying, by a solidifying device, a selective layer-part of the material on the surface level; and
controlled oxidization, of waste particles originating from the solidifying of the material, by controlling an oxygen level, such that oxidized waste particles are obtained and ignition of the waste particles is avoided,
wherein the process chamber is configured to allow, during the step of solidifying, ambient air to enter the process chamber, and
wherein during the step of controlled oxidization, a controlled amount of inert gas is supplied to the process chamber to realize a desired oxygen level in the process chamber for controlled oxidization of the waste particles to obtain the oxidized waste particles.

21. A method for producing an object by additive manufacturing, the method comprising the steps of:
receiving, in a process chamber, a bath of material, wherein a surface level of the bath of material defines an object working area;
solidifying, by a solidifying device, a selective layer-part of the material on the surface level; and
controlled oxidization, of waste particles originating from the solidifying of the material, by controlling an oxygen level in the process chamber, such that oxidized waste particles are obtained and ignition of the waste particles is avoided,
wherein during the step of solidifying:
the oxygen level in the process chamber is in the range of 50 ppm to 1000 ppm;
the controlled oxidization is performed in the process chamber; and
the oxygen level is maintained constant during the step of solidifying.

22. A method for producing an object by additive manufacturing, the method comprising the steps of:
receiving, in a process chamber, a bath of material, wherein a surface level of the bath of material defines an object working area;
solidifying, by a solidifying device, a selective layer-part of the material on the surface level; and
controlled oxidization, of waste particles originating from the solidifying of the material, by controlling an oxygen level, such that oxidized waste particles are obtained and ignition of the waste particles is avoided,
wherein the controlled oxidization is performed during a step of filtering and/or during a step of transferring the waste particles, collected by a filter device, to a storage device for storing the waste particles removed from the filter device, wherein the storage device is configured for the controlled oxidization.

* * * * *